United States Patent [19]

Every, Sr. et al.

[11] Patent Number: 5,472,230
[45] Date of Patent: Dec. 5, 1995

[54] PORTABLE VEHICULAR AIR BAG DEVICE

[76] Inventors: Robert H. Every, Sr., 139 S. Hopkins St.; Robert M. Strait, 824 N. Wilbur Ave., both of Sayre, Pa. 18840

[21] Appl. No.: 349,036

[22] Filed: Dec. 2, 1994

[51] Int. Cl.⁶ ................................................. B60R 21/16
[52] U.S. Cl. ........................... 280/728.2; 280/730.1; 280/732
[58] Field of Search ............... 280/728.2, 730, 280/733, 728, 732, 735, 752; 200/61.54, 61.45

[56] References Cited

U.S. PATENT DOCUMENTS

| | | | |
|---|---|---|---|
| 3,243,822 | 4/1966 | Lipkin | 244/121 |
| 3,706,462 | 12/1972 | Lilly | 280/733 |
| 3,736,004 | 5/1973 | Haruna | 280/733 |
| 3,874,694 | 4/1975 | Stephenson | 280/733 |
| 5,062,662 | 11/1991 | Cameron | 280/733 |
| 5,114,185 | 5/1992 | Reedom | 280/801.1 |
| 5,162,006 | 11/1992 | Yandle, II | 441/96 |
| 5,242,193 | 9/1993 | Humpal | 280/733 |
| 5,333,902 | 8/1994 | Hatfield | 280/733 |

Primary Examiner—Margaret A. Focarino
Assistant Examiner—Christopher Ellis
Attorney, Agent, or Firm—Barnard, Brown & Michaels

[57] ABSTRACT

An anti-collision device in the form of a portable air bag which may be attached to the dashboard of any car. The air bag may be easily moved from car to car or left attached in a single car, adding the passenger side protection which was omitted by the manufacturer. The invention is independently powered, and requires no more effort to install than attaching the base to the vehicle dashboard, adjusting the angle, and turning the device on. If desired, the device can be attached to the dashboard with Velcro® fastening material or the like, allowing easy movement between multiple vehicles. The activating mechanism automatically adapts to any angle of dashboard, and automatically triggers the bag on impact without need for manual intervention. The activation mechanism is disarmed when the bag is turned off and/or removed from a dashboard, eliminating the danger of false triggering when it is not installed.

14 Claims, 4 Drawing Sheets

PORTABLE VEHICULAR AIR BAG DEVICE

FIELD OF THE INVENTION

The invention pertains to the field of automotive safety devices. More particularly, the invention pertains to devices commonly called "air bags" and designed to inflate upon impact or impending impact and thereby confine a vehicle occupant in a protective environment made up of confinement bag(s) and the vehicle seat.

BACKGROUND OF THE INVENTION

Automotive safety is concerned with reducing the number of traffic accidents and lessening the severity of injuries when accidents do occur.

Vehicle design gradually improved throughout the history of the automobile industry; higher speeds and heavier traffic, nevertheless, added to a climbing accident rate. In an attempt to deal with the problem, the U.S. Congress passed (1966) a law that permitted the federal government to issue mandatory safety standards for cars, trucks, motorcycles, and other vehicles. Since that time, more than 50 safety standards have been imposed, regulating safety windshields, safety belts, head restraints, brakes, tires, lighting, door strength, and roof strength.

Because of the poor response of the driving public to devices that require their active participation, safety researchers have developed automatic, or passive, restraint systems, which protect occupants without any action on their part. Two basic types of passive restraints have been produced. One, the automatic belt, fastens around the occupant when the car door is closed. The second is the air bag.

In a crash, an air bag—usually one in the steering column and, more recently, one in the right side of the dashboard—pop out and instantly inflate, forming cushions that prevent the occupants from striking hard surfaces, such as the dashboard or windshield.

It is estimated that about 12,000 lives could be saved and tens of thousands of severe injuries prevented each year if all cars had automatic restraint systems. The U.S. Department of Transportation (DOT) proposed in 1977 that all new cars be equipped with such systems by model year 1984, although major emphasis was on air bags rather than automatic seat belts. Automobile manufacturers objected, principally because the cost of air bags is high: $300 to $1,000 per car, depending on the volume of cars outfitted. New air bag designs have reduced that cost considerably, however, and driver's side air bags have been standard on most cars for several years. Many cars also add one on the passenger side, although they are still in the minority. Millions of older vehicles remain unprotected by air bags.

Until the present invention, if a car owner wishes to have the protection of passenger side air bag there was no practical alternative to purchasing a new car with the dual air bag system. Economically, this is not practical for most people. In the case of some classes or brands of cars, the second air bag is not available at any price.

There are several patents on air bag systems which are independent of the vehicle structure, but they all share severe drawbacks.

Lipkin, U.S. Pat. No. 3,243,822, is typical of the user-worn air bag. The safety device is in the form of a balloon built into a sort of life-vest or jacket, and is manually activated when the user fears a crash is imminent. The balloon stays inflated until the wearer deflates it. There are several problems with this approach. First, if it is nearly impossible to get some people to fasten seat belts, even when every car has been equipped with them since the early 1970's, how likely is it that such people will be willing to don a bulky life vest every time they climb into a car? Even if your passenger might be inclined to wear such a device, how do you protect all of the various people who might ride in your car, if they do not own life vests? Second, and most important, any system which relies on user-activated inflation is not practical. Most automobile collisions occur so fast that there is simply no time to inflate a balloon manually by the time the user realizes that such inflation is required. For that matter, a fully inflated balloon filling the space between the passenger and the dashboard as soon as a passenger feels unsafe could introduce an additional safety hazard for the driver trying to control the car.

Yandle, U.S. Pat. No. 5,162,006, is representative of the second class of air bag devices which have been proposed: those fitting into, or attaching to, the lap/shoulder belts in the car. All of the shoulder belt attached air bags share the additional drawback that they only work if the shoulder belt is worn, which runs counter to the whole intention of passive restraints. Like Lipkin, Yandle depends upon manual activation of the air bag, with the drawbacks mentioned above. Alternatively, Yandle and others of this sort of device allow the trigger to attach to the car seat or body so that if the wearer exceeds a certain degree of forward travel the bag is activated. The impracticality of this approach is obvious—one can envision reaching for the radio dial at high speed and being slapped in the face by an exploding air bag, with predicable results.

Both of the prior art approaches are incompatible with the kind of impact-sensor automatic triggers which are necessary to inflate the air bag quickly enough to do any good. If the air bag is worn by the user, whether on the person or on a belt, it would be easily triggered by user movement or likely to be at an unusable angle when most needed.

SUMMARY OF THE INVENTION

The invention presents an anti-collision device in the form of a potable air bag which may be attached to the dashboard of any car. The air bag may be easily moved from car to car or left attached in a single car, adding the passenger side protection which was omitted by the manufacturer. It can be easily removed to prevent theft. The invention is independently powered, and requires no more effort to install than attaching the base to the vehicle dashboard, adjusting the angle, and turning the device on. If desired, the device can be attached to the dashboard with Velcro® fastening material or the like, allowing easy movement between multiple vehicles. The activating mechanism automatically adapts to any angle of dashboard, and automatically triggers the bag on impact without need for manual intervention. The activation mechanism is disarmed when the bag is turned off and/or removed from a dashboard, eliminating the danger of false triggering when it is not installed.

DESCRIPTION OF THE PREFERRED EMBODIMENT

Figure 1:
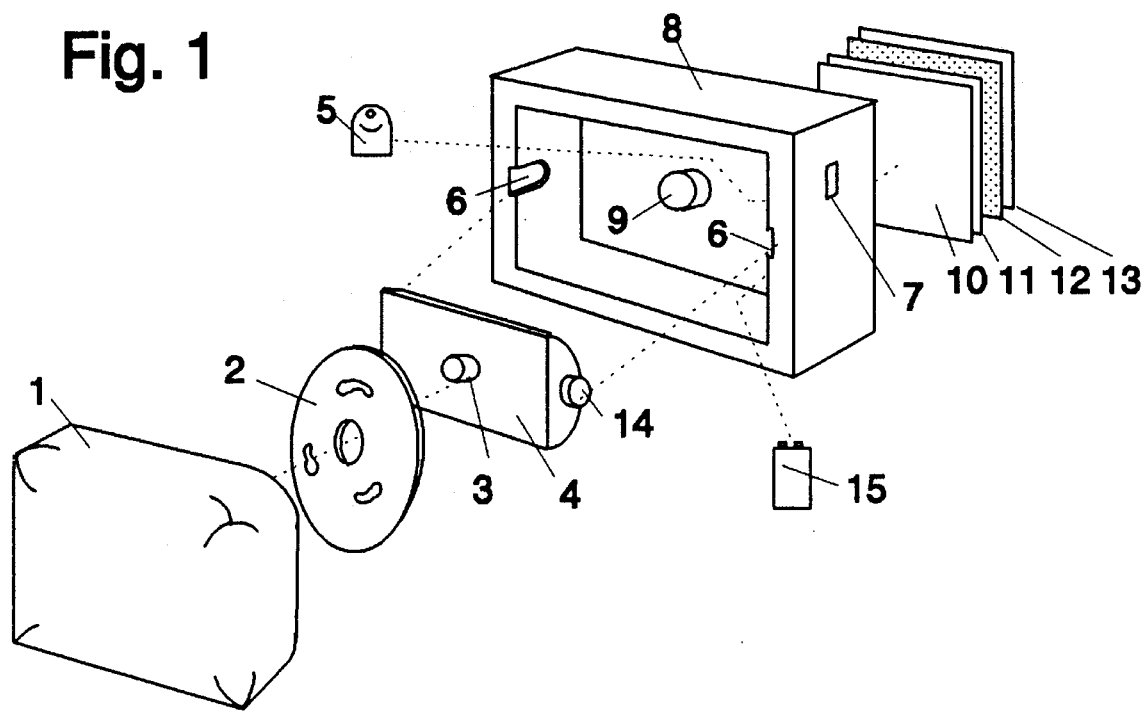
FIG. 1 shows an exploded view of the invention in its preferred embodiment.

FIG. 1 shows an exploded view of the preferred embodiment of the invention. Details of the wiring of the components are omitted for clarity.

The invention is a portable air bag which can be easily and quickly installed into, and removed from, a car. The air bag (1) is a conventional bag, as is commonly included in current production automobiles. The bag (1) mounts to a base plate (4). The use of a twist-lock mounting plate (2) to secure the bag (1) to the base plate (4) will allow easy removal and replacement of the bag. The base plate (4) has lugs (14) which fit into slob (6) in the case (8). This allows the base plate (4) to swivel within the case (8) to adjust the angle of the air bag, as will be discussed below.

The preferred embodiment shown uses an explosive element activator (3) to inflate the air bag (1), as is common in the industry. The explosive element (3) can also be easily replaced at the same time as the air bag. It is anticipated that it could be purchased through automobile dealers, parts shops or general merchandise stores. The air bag and charge could be sold as a kit, to enable easy replacement in case of accidental discharge. The charge can be a conventional air bag charge as currently installed in factory-equipped air bags, or can be the charge from a 20-gauge shotgun shell. In any event, it must be capable of being ignited electrically and quickly to inflate the bag in the brief time required to counteract the forces of a collision.

The case (8) also houses the trigger unit (5), which will be detailed below, and the battery (15) for powering the unit. The battery needs to be appropriate for the method of triggering the inflation of the bag, and might need to be one or more cells depending on the required voltage and current. A common 9 volt transistor radio battery will supply sufficient energy to trigger the explosive charge.

An on/off master switch (7) protrudes through the side of the case (8) to control the unit and lock or unlock the trigger, as will be made clear below.

The portable air bag unit is preferably mounted using hook and loop fastener material (Velcro®). A layer of adhesive (10), such as double-stick tape material, is placed on the back of the case (8), and one side of the fastener material (11) is adhered to the adhesive layer. The mating fastener layer (12) is stuck to an internal surface of the vehicle such as the dashboard with a similar adhesive layer (13). Additional layers of fastener (12) can be attached via adhesive layers (13) to other locations, for example in a second car, so that a single air bag unit may be transferred from car to car if desired. If the unit is to be permanently mounted, the Velcro could be omitted and the adhesive layer used to attach the case to the car.

Figure 6:
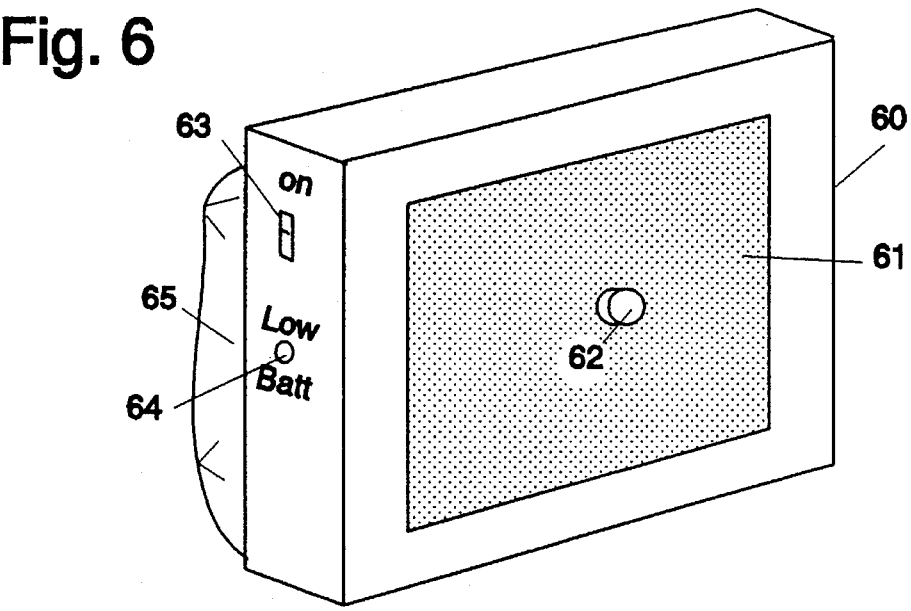
FIG. 6 shows a detail of the rear of the invention, showing the safety switch.

A safety switch (9) of the SPST normally open pushbutton type can be optionally placed on the back of the case (8) to prevent accidental activation of the air bag when the unit is not installed in a car. FIG. 6 shows more details of this switch. In that figure, the switch button (62) protrudes through the Velcro (61) on the back of the case (60). Fastening the case (60) to the mating Velcro on the dashboard of the car depresses the safety switch button (62), enabling the circuitry of the air bag unit.

Figure 2A:
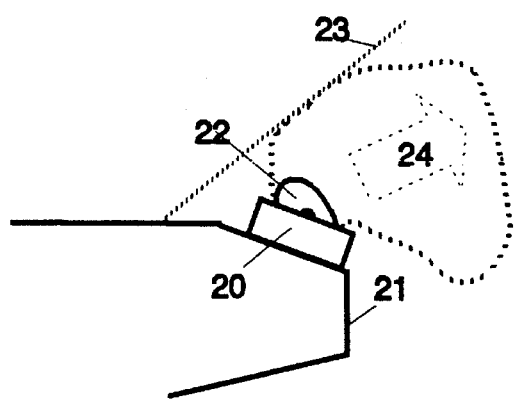
FIGS. 2a and 2b show the invention installed on the dashboard of a car.
Figure 2B:
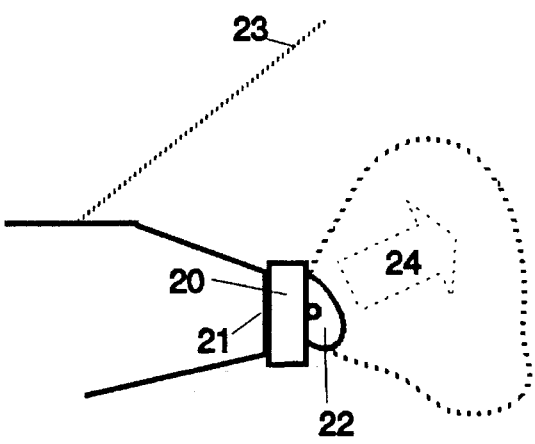

FIGS. 2*a* and 2*b* show the air bag unit mounted on the dashboard (21) of a car. The case (20) is attached to the dashboard (21) using the Velcro or other fastening method. The air bag on its mounting plate (22) is swiveled to aim the axis of the air bag as much as possible toward the face and upper torso of the passenger. The preferred embodiment of the invention allows sufficient swiveling to allow the bag to point at or near the passenger, under most combinations of dashboard and case. It is not necessary that the bag be accurately pointed, however. FIG. 2*b* shows the case (20) mounted on a vertical portion of the dashboard (21) in which the deployed air bag (25) can extend freely toward the passenger's face and upper torso. This will probably be the most common situation.

As shown in FIG. 2*a*, however, even if the angle of the dashboard (21) or proximity of the windshield (23) prevent direct aiming of the deployed bag (24), it will still inflate outwards, against the window (23) if necessary, to protect the passenger.

The angle of the dashboard or other mounting point will vary widely from car to car, from almost horizontal through vertical and even slightly angled downwards on some cars. Regardless of dashboard angle, the trigger mechanism must remain approximately horizontal, so that it can trigger the air bag in case of an impact. This is simple in permanent installations built into cars, but not at all simple for a unit which can be used from car to car.

Figure 3A:
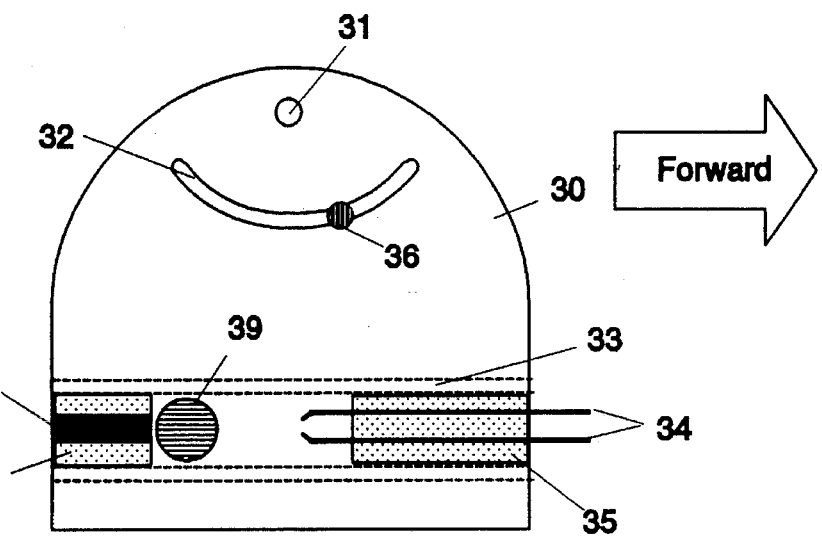
FIG. 3a shows a side view of the trigger mechanism of the invention.
Figure 3B:
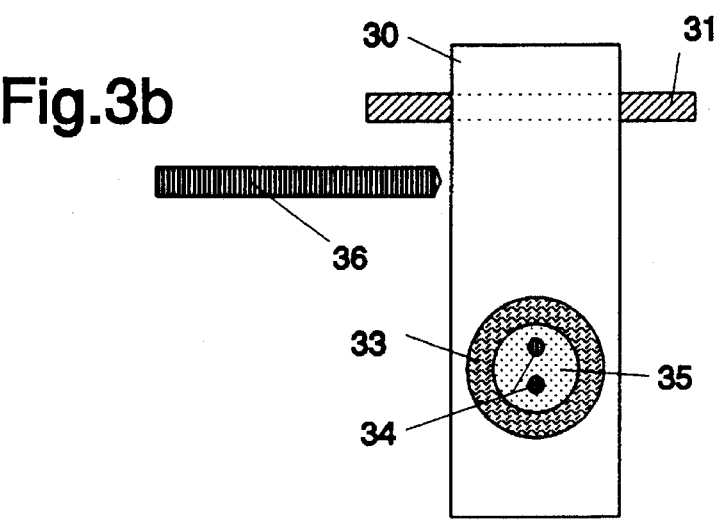
FIG. 3*b* shows a rear view of the trigger mechanism of the invention.

FIGS. 3*a* and 3*b* show the trigger mechanism of the preferred embodiment of the invention. FIG. 3*a* is a side view, with "forward" (i.e. toward the front of the car) to the right. FIG. 3*b* is a front view, with "forward" out of the paper.

The trigger mechanism body (30) can be made of any nonmagnetic material, preferably a plastic such as nylon. A pivot hole (31) at the top of the body (30) allows the trigger to pivot freely fore-and-aft as the air bag unit is mounted on the dashboard. The pivoting should allow the trigger to remain horizontal through a wide range of mounting angles, preferably at least 90° (case horizontal through case vertical), and possibly as much as 120°, to allow up to 30° of downward mounting angle.

The trigger mechanism must be locked in position once the unit is mounted. This lock is preferably part of or connected to the power switch so that when the power to the unit is turned on the trigger is locked in position. The following description is preferable, but other methods of locking the trigger in position are possible within the teachings of the invention.

The trigger angle lock works as follows: An arcuate slot (32) is formed in the body. A lock pin (36) is forced into the slot (32) to lock the trigger in position when the power switch is turned on. This can be done by having the lock pin (36) formed as an extension of a locking pushbutton switch, wherein pushing the button in ("on") extends the locking pin (36) into the slot (32), locking the trigger in position. Alternatively, if a slide switch is used, the switch slide could activate a lever to extend the pin. Other arrangements are possible.

The trigger itself is mounted in a passage bored through the body (30) of the trigger mechanism. The passage is preferably lined with a nonmagnetic metal sleeve (33). In the rearward end of the sleeve (33) (i.e. the end which is toward the back of the car) is a magnet (37), which can be encased in a plastic plug (38) threaded or press-fit into the sleeve (33). The magnet (37) attracts and holds a steel ball (39) small enough to move freely in the sleeve (33) strongly enough to hold the ball in place in all but the most severe decelerations. The gap between the contacts and the ball, when the ball is seated against the magnet is preferably about 0.312". If the ball is dislodged, it will be immediately drawn back by the magnet. In the opposite, forward, end of the sleeve (33) are a pair of electrical conductors (34) mounted in a nonconductive plug (35) threaded or press-fit into the sleeve (33). The conductors (34) end inside the sleeve (33), and are arranged such that the ball (39) can contact both conductors (34), closing the circuit between the conductors.

The operation of the trigger is as follows: When the unit is turned on, the trigger body (30) is locked in horizontal position, with the steel ball (39) seated against the magnet (37). If the car is subject to extreme deceleration, as in an impact, the ball (39) flies off the magnet (37) and contacts the conductors (34), closing the circuit between them.

Figure 5:
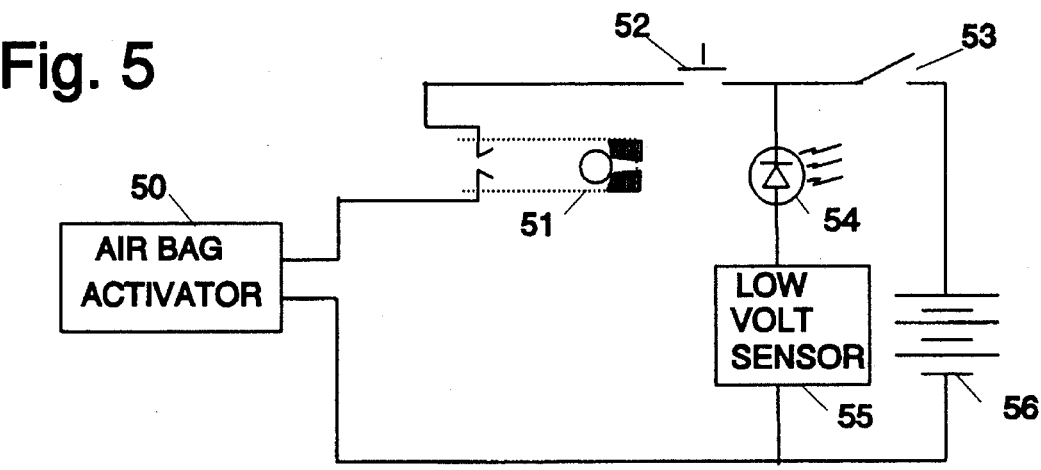
FIG. 5 shows a schematic diagram of the invention.

FIG. 5 shows the schematic of the unit. The the battery (56) is in series with the air bag activator (50), the trigger unit (51), the on/off main switch (53) and, optionally, the single-throw type safety switch (52). All of the switches are normally open, so that all must close to trigger the air bag. That is, the unit must be on (switch (53)), it must be mounted (if safety switch (52) is fitted), and the ball must be closing the trigger (51) circuit.

Figure 8:
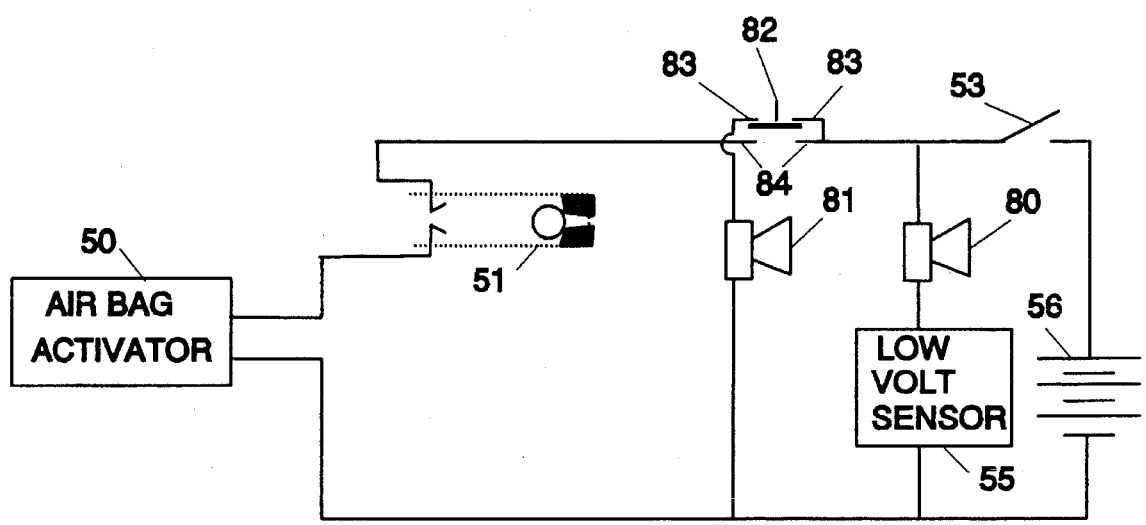
FIG. 8 shows a schematic diagram of the invention, with safety removal alert feature.

It is possible that a user could remove the unit from the dashboard of a car while the main power switch (53) is on. The safety switch would prevent the bag from deploying immediately, but if the unit is then installed on a dashboard with another slope, or if the ball in the trigger has been jarred loose during transport while it is turned on, it is possible that the air bag could immediately deploy as soon as the safety switch is once again closed by installation. FIG. 8 shows a schematic of the unit in a variant having a safety removal alert feature to prevent this occurrence. The safety switch (82) is a double-throw type having normally open contacts (84) which are connected when the unit is installed on a surface (i.e. the switch is pressed against the mounting) and normally closed (83) contacts which are closed when the unit is removed (i.e. the switch is in the extended position). The normally closed contacts (84) are connected as in the single-throw switch (52) used in FIG. 5. The normally open contacts (83) are connected to a warning device (81) such as a piezoelectric buzzer or the like (81). In this arrangement, if the main power switch (53) is on and the safety switch (82) is out, indicating the unit has been removed from its mounting with the switch on, the warning buzzer (81) will sound warning the user to switch the unit off.

As an option, a low voltage sensor (55) and indicator (LED (54)) may be put in parallel with the battery (56) to monitor the battery voltage. The sensor may be on either side of the main switch (53), but is preferably on the "cold" side of the switch so that there is no drain when the switch (53) is off. In the alternative, a beeper such as a piezoelectric buzzer or the like can be used instead of (or in addition to) the low-voltage light, as shown at (80) in FIG. 8.

Figure 4:
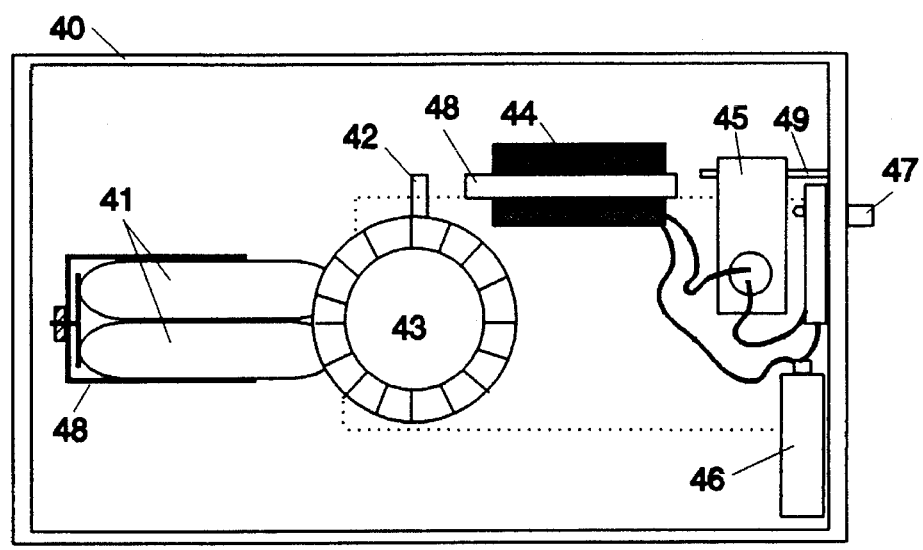
FIG. 4 shows a detail of the invention, in its CO$_2$-powered embodiment.

FIG. 4 shows an alternate embodiment of the invention, using $CO_2$ cartridges (41) to power the air bag instead of the explosive being currently used. This embodiment is safer, in that there is no explosion involved in the activation. The air bag itself (not shown) may be made of a material such as Tyvek®, since there is no need for flame resistance.

The $CO_2$ cartridges (41) can be those which are commonly available for such applications as air guns, carbonated beverage making, etc. They are mounted into the case (40) in a holder (48) which both holds the cartridges (41) and forces them against a fitting (not shown) in the porting disc (43) which punctures the cartridge (41) and seals the end against leakage. This is the same arrangement used in air guns or the like.

The battery (46), main switch (47) and trigger mechanism (45) on its pivot (49) are the same as used in the explosive-powered embodiment (although the exact battery used might differ depending on the varied voltage and current requirements). The air bag is activated by a solenoid (44) which, when activated by the battery/main switch/trigger series circuit, causes solenoid rod (48) to move a trigger valve (42), which releases the $CO_2$ into the air bag through porting disc (43), inflating the air bag.

A solenoid is the preferred means of triggering the valve, but it will be understood that other means might be employed, such as piezoelectric activated valves, motors, voice coils, etc.

Figure 7:
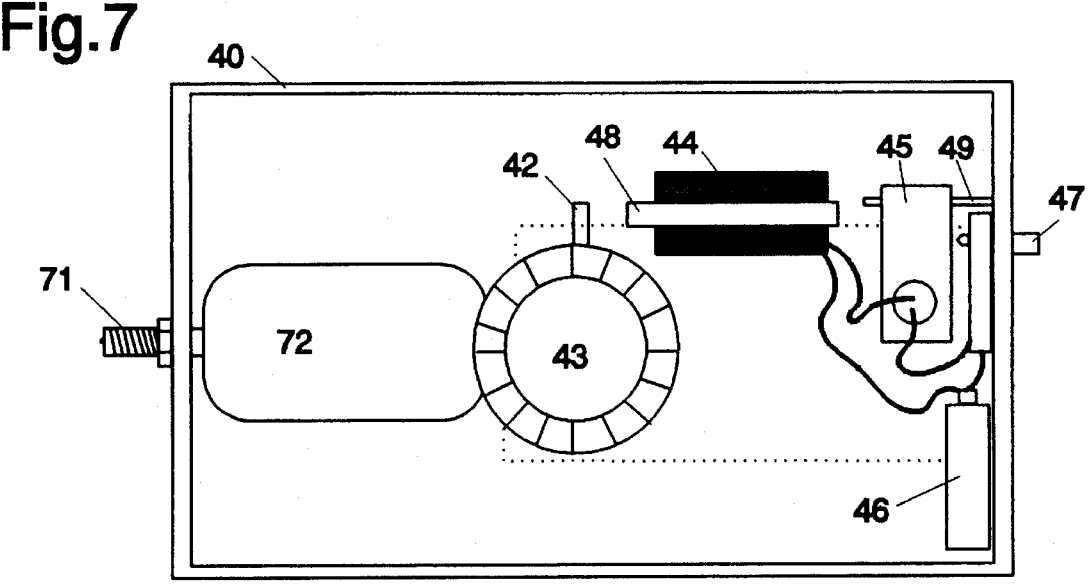
FIG. 7 shows a detail of the invention, in its compressed gas powered embodiment.

FIG. 7 shows a variation on the above-described $CO_2$ powered embodiment, in which a compressed gas reservoir (72) is substituted for the $CO_2$ cartridges. The gas used can be compressed air, which can be easily introduced into the reservoir through a Schroeder valve (71), allowing the unit to be charged at any tire pump. The rest of the embodiment would be the same as discussed above for FIG. 4.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

We claim:

1. A portable vehicular air bag device, comprising:

a) a case;

b) means for removably mounting the case on an interior surface of a motor vehicle;

c) an air bag mounted in the case having gas input means for inflating the air bag with a gas;

d) an activator having an electrical input and a gas output connected to the air bag gas input means, such that an activating signal on the electrical input causes the activator to produce sufficient gas at the gas output to inflate the air bag through the gas input means;

e) a power source;

f) trigger means for causing the air bag to inflate in response to an impact, having an electrical input connected to the power source, an electrical output connected to the electrical input of the activator and an impact sensor which causes the activating signal for the activator to appear on the electrical output when an impact is sensed, the trigger means being mounted such that it can be swiveled to remain horizontal when the case is mounted on an interior surface of a motor vehicle.

2. A portable vehicular air bag device, comprising:

a) a case;

b) means for removably mounting the case on an interior surface of a motor vehicle;

c) an air bag mounted in the case having gas input means for inflating the air bag with a gas;

d) an activator having an electrical input and a gas output connected to the air bag gas input means, such that an activating signal on the electrical input causes the activator to produce sufficient gas at the gas output to inflate the air bag through the gas input means;

e) a power source;

f) trigger means for causing the air bag to inflate in response to an impact, having an electrical input connected to the power source, an electrical output connected to the electrical input of the activator and an impact sensor which causes the activating signal for the activator to appear on the electrical output when an impact is sensed, the trigger means being mounted such that it can be swiveled to remain horizontal when the case is mounted on an interior surface of a motor vehicle, comprising:

i) a body pivotally mounted to the case, such that the body may freely swing to remain horizontal as the case is mounted to the interior surface of the vehicle;

ii) locking means for selectively preventing the pivoting of the body;

iii) an impact switch mounted on the body, having an input forming the electrical input of the trigger and an output forming the electrical output of the trigger, such that the input of the impact switch is connected to the output of the impact switch when an impact is sensed.

3. The portable vehicular air bag device of claim 2, in which the impact switch comprises:

a) a magnet located at the rearward end of a passage in the body extending from front to rear, relative to the motor vehicle;

b) a magnetic, electrically conductive ball capable of being attracted to the magnet;

c) two conductors located at the frontward end of the passage in the body extending from front to rear, relative to the motor vehicle, such that when the ball is detached from the magnet and moved to the frontward end of the passage by an impact, the two conductors are connected to each other by the ball, one of the two conductors being connected to the electrical input of the trigger, the other conductor being connected to the electrical output of the trigger.

4. The portable vehicular air bag device of claim 2, in which the device further comprises master switch means electrically located between the electrical output of the trigger and the electrical input of the activator, having an ON position in which the electrical output of the trigger is connected to the electrical input of the activator through the master switch, and an OFF position in which the electrical output of the trigger is not connected to the electrical input of the activator, and the locking means is connected to the master switch such that the locking means prevents the body from pivoting when the master switch is in the ON position and allows the body to pivot when the master switch is in the OFF position.

5. The portable vehicular air bag device of claim 1, in which the air bag is mounted in the case such that the air bag may be adjusted in angle relative to the case.

6. The portable vehicular air bag device of claim 1, in which the activator comprises an explosive device.

7. The portable vehicular air bag device of claim 1, in which the activator comprises:

a) compressed gas storage having an output for supplying gas under pressure;

b) valve means for controlling gas flow, having a gas input connected to the output of the compressed gas storage, a switched output forming the gas output of the activator, and control input means for controlling the flow of gas from the gas input to the switched output;

c) electrically operated control means for switching the control input means of the valve means, having an electrical input forming the electrical input of the activator and a mechanical output connected to the control input of the valve means, such that when an electrical signal is applied to the electrical input of the electrically operated control means the mechanical output activates the control input of the valve means, inflating the air bag.

8. The portable vehicular air bag device of claim 7, in which the compressed gas is air.

9. The portable vehicular air bag device of claim 7, in which the compressed gas is carbon dioxide.

10. The portable vehicular air bag device of claim 1, in which the mounting means comprises mating hook and loop fasteners on the case and on the interior surface of the motor vehicle.

11. A portable vehicular air bag device comprising:

a) a case;

b) means for removably mounting the case on an interior surface of a motor vehicle;

c) an air bag mounted in the case having gas input means for inflating the air bag with a gas;

d) an activator having an electrical input and a gas output connected to the air bag gas input means, such that an activating signal on the electrical input causes the activator to produce sufficient gas at the gas output to inflate the air bag through the gas input means;

e) a power source;

f) trigger means for causing the air bag to inflate in response to an impact, having an electrical input connected to the power source, an electrical output connected to the electrical input of the activator and an impact sensor which causes the activating signal for the activator to appear on the electrical output when an impact is sensed, the trigger means being mounted such that it can be swiveled to remain horizontal when the case is mounted on an interior surface of a motor vehicle;

g) master switch means electrically located between the electrical output of the trigger and the electrical input of the activator, having an ON position in which the electrical output of the trigger is connected to the electrical input of the activator through the master switch, and an OFF position in which the electrical output of the trigger is not connected to the electrical input of the activator, and h) safety switch means electrically located between the electrical output of the trigger and the electrical input of the activator, having an ON position in which the electrical output of the trigger is connected to the electrical input of the activator through the master switch, and an OFF position in which the electrical output of the trigger is not connected to the electrical input of the activator, and the safety switch is moved to the ON position when the case is mounted to the interior surface of the motor vehicle, and to the OFF position when the case is not mounted to the interior surface of the motor vehicle.

12. The portable vehicular air bag device of claim 11, in which the safety switch further comprises pushbutton means for causing the safety switch means to move from the OFF position to the ON position, extending from the rear of the case such that the pushbutton means contacts the interior surface of the motor vehicle when the case is mounted thereon.

13. The portable vehicular air bag device of claim 11, in which
   a) the safety switch further comprises normally closed contacts which are connected when the safety switch is in the OFF position;
   b) the device further comprises buzzer means for alerting a user, having an electrical input such that a signal present at the electrical input causes the buzzer means to emit a user-sensible signal; and
   c) the normally closed contacts of the safety switch are electrically connected to the electrical input of the buzzer means and to the electrical power after the master switch, such that if the safety switch is in the OFF position and the master switch is in the ON position, the buzzer means will emit a user-sensible alert.

14. The portable vehicular air bag device of claim 1, further comprising low voltage alert means comprising:
   a) low voltage sensing means having a sensing input and an alert output, such that the alert output emits an electrical signal when the sensing input detects a voltage below a predetermined level;
   b) alerting means for warning of a low voltage condition, having an electrical input such that a signal present at the electrical input causes the alerting means to emit a user-sensible signal; and
   c) the sensing input of the low voltage sensing means is connected to the power source, such that the alerting means emits a user-sensible signal when the voltage of the power source falls below a predetermined level.

* * * * *